(12) United States Patent
Wang et al.

(10) Patent No.: US 10,626,047 B2
(45) Date of Patent: Apr. 21, 2020

(54) GLASS CONTAINER COATING PROCESS

(71) Applicant: Owens-Brockway Glass Container Inc., Perrysburg, OH (US)

(72) Inventors: Zhongming Wang, Ypsilanti, MI (US); Carol A. Click, Perrysburg, OH (US); Michael P. Remington, Toledo, OH (US); D Wayne Leidy, Philadelphia, PA (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 387 days.

(21) Appl. No.: 15/296,795

(22) Filed: Oct. 18, 2016

(65) Prior Publication Data
US 2018/0105456 A1  Apr. 19, 2018

(51) Int. Cl.
| | |
|---|---|
| *C03C 17/00* | (2006.01) |
| *C03B 25/02* | (2006.01) |
| *C03B 9/14* | (2006.01) |
| *C03B 9/193* | (2006.01) |
| *C03C 17/25* | (2006.01) |
| *C03B 9/44* | (2006.01) |

(Continued)

(52) U.S. Cl.
CPC .............. *C03C 17/004* (2013.01); *C03B 9/14* (2013.01); *C03B 9/193* (2013.01); *C03B 9/30* (2013.01); *C03B 9/36* (2013.01); *C03B 9/44* (2013.01); *C03B 9/453* (2013.01); *C03B 25/02* (2013.01); *C03C 17/25* (2013.01); *C03C 17/256* (2013.01); *C03C 2218/11* (2013.01)

(58) Field of Classification Search
CPC ..... C03C 17/004; C03C 17/25; C03C 17/256; C03B 25/02; C03B 9/14; C03B 9/36; C03B 9/30; C03B 9/193; C03B 9/44; C03B 9/453
See application file for complete search history.

(56) References Cited

U.S. PATENT DOCUMENTS

| | | |
|---|---|---|
| 2,504,482 A | 4/1950 | Goldman |
| 2,832,701 A | 4/1958 | Miskel |

(Continued)

FOREIGN PATENT DOCUMENTS

| | | |
|---|---|---|
| EP | 0825155 | 2/1998 |
| JP | 2000033945 A | 2/2000 |

(Continued)

OTHER PUBLICATIONS

PCT Search Report and Written Opinion, Int. Application No. PCT/US2017/052844, Int. Filing Date: Sep. 22, 2017, Applicant: Owens-Brockway Glass Container Inc., dated Dec. 1, 2017.

*Primary Examiner* — Joseph S Del Sole
*Assistant Examiner* — Mohamed K Ahmed Ali

(57) ABSTRACT

A process for forming coating on an interior surface of a glass container. A glass preform is formed at blank molding station from a gob of molten glass. Thereafter, a glass container is formed at a blow molding station from the glass preform. A coating material comprising a suspension of nanoparticles in a liquid medium is introduced into an interior of the glass preform or the glass container while the glass is still hot from being formed. Heat from the glass is transferred to the liquid medium to vaporize the liquid medium and form a coating on an interior surface of the glass preform or the glass container. Thereafter, the glass container is annealed.

20 Claims, 6 Drawing Sheets

(51) Int. Cl.
*C03B 9/453* (2006.01)
*C03B 9/30* (2006.01)
*C03B 9/36* (2006.01)

(56) References Cited

U.S. PATENT DOCUMENTS

| | | |
|---|---|---|
| 3,182,839 A | 5/1965 | Hoag |
| 3,337,321 A | 8/1967 | Teague, Jr. et al. |
| 3,598,269 A | 8/1971 | Carmen |
| 3,833,406 A | 9/1974 | White |
| 3,972,435 A | 8/1976 | Sasaki et al. |
| 4,134,746 A | 1/1979 | Levene et al. |
| 4,171,056 A | 10/1979 | Hannon et al. |
| 4,206,253 A | 6/1980 | Watanabe |
| 4,260,066 A | 4/1981 | Hannon et al. |
| 4,371,387 A * | 2/1983 | Scholes ............... C03B 9/385 65/118 |
| 4,393,106 A | 7/1983 | Maruhashi et al. |
| 4,746,538 A | 5/1988 | Mackowski |
| 4,891,241 A | 1/1990 | Hashimoto et al. |
| 4,961,976 A | 10/1990 | Hashimoto et al. |
| 4,985,286 A | 1/1991 | Kurita et al. |
| 5,112,658 A | 5/1992 | Skutnik et al. |
| 5,162,136 A | 11/1992 | Blum et al. |
| 5,372,623 A | 12/1994 | Ueda et al. |
| 5,378,510 A | 1/1995 | Thomas et al. |
| 5,455,087 A | 10/1995 | Skutnik et al. |
| 5,567,235 A | 10/1996 | Carson et al. |
| 5,707,691 A | 1/1998 | Plester et al. |
| 6,013,333 A | 1/2000 | Carson et al. |
| 6,247,603 B1 | 6/2001 | Farrell et al. |
| 6,599,594 B1 | 7/2003 | Walther et al. |
| 7,357,863 B2 | 4/2008 | Patton et al. |
| 7,871,558 B2 | 1/2011 | Merical et al. |
| 7,877,968 B2 | 2/2011 | Kim et al. |
| 8,003,178 B2 | 8/2011 | Kim et al. |
| 8,110,260 B2 | 2/2012 | Merical et al. |
| 2004/0221615 A1 | 11/2004 | Postupack et al. |
| 2005/0221003 A1 | 10/2005 | Remington, Jr. |
| 2006/0021384 A1 * | 2/2006 | Schramm ............... C03B 40/02 65/26 |
| 2006/0260360 A1 * | 11/2006 | Dick ............... C03B 17/04 65/60.53 |
| 2009/0084799 A1 * | 4/2009 | Mondon ............... C03B 9/1932 220/674 |
| 2009/0104369 A1 * | 4/2009 | Rajala ............... C03C 17/001 427/475 |
| 2010/0193461 A1 | 8/2010 | Boutroy et al. |
| 2001/0100858 | 5/2011 | Wagner |
| 2011/0159219 A1 | 6/2011 | Yue et al. |
| 2011/0244153 A1 | 10/2011 | Shiozawa et al. |
| 2014/0116911 A1 | 5/2014 | Bryant |
| 2015/0059409 A1 | 3/2015 | Ravel et al. |

FOREIGN PATENT DOCUMENTS

| | | |
|---|---|---|
| JP | 2009167056 A | 7/2009 |
| WO | WO 92/20633 | 11/1992 |
| WO | WO 2009/104160 A1 | 8/2009 |
| WO | WO 2009/104161 A2 | 8/2009 |

* cited by examiner

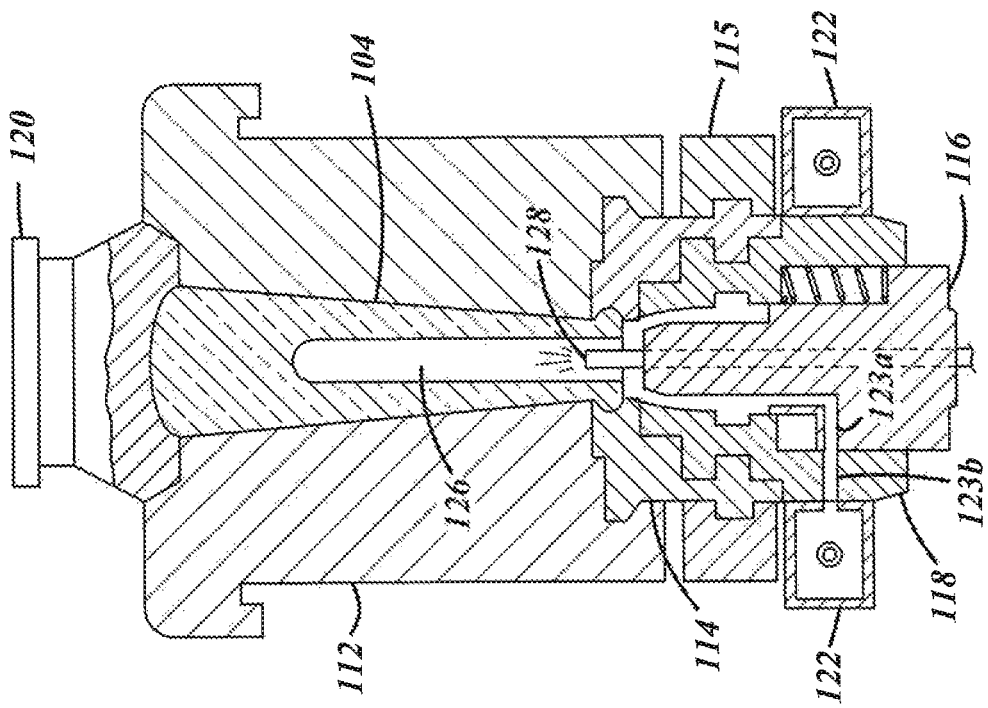
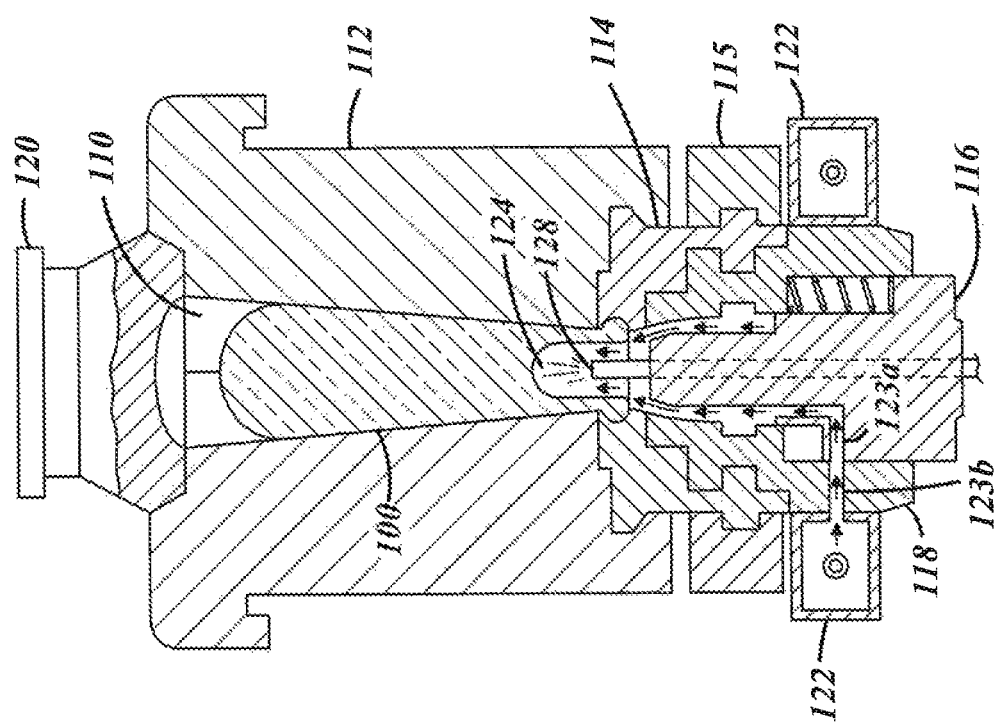

GLASS CONTAINER COATING PROCESS

The present disclosure is directed to glass containers, and, more particularly, to coating processes for glass containers, e.g., bottles, jars, and the like.

BACKGROUND AND SUMMARY OF THE DISCLOSURE

Various processes have been developed to apply coatings to glass containers for different purposes, including decoration, ultraviolet light protection, lubricity, and abrasion resistance. In a conventional glass container manufacturing process, a hot end coating is applied to an exterior surface of a formed glass container at a so-called "hot end" of an annealing lehr, immediately after the glass container is formed. An additional cold end coating is conventionally applied to the exterior surface of the glass container at a "cold end" of the annealing lehr, after the glass container has been cooled down to a temperature below the strain point of the glass by being passed through the annealing lehr. The hot end coating typically comprises a metal oxide, e.g., an oxide of tin, titanium, vanadium, or zirconium, and the cold end coating typically comprises an organic material, e.g., silicone wax, polyethylene, polyvinyl alcohol, stearic acid, oleic acid, polyurethane, polyester, polyolefin, or polyacrylic material.

A general object of the present disclosure, in accordance with one aspect of the disclosure, is to provide a process for coating an interior surface of a glass container that may be performed during or after formation of the glass container, but preferably before the glass container is annealed.

The present disclosure embodies a number of aspects that can be implemented separately from or in combination with each other.

A process for coating an interior surface of a glass container, in accordance with one aspect of the disclosure, includes: (a) forming a glass preform from a gob of molten glass at a blank molding station, (b) transferring the glass preform from the blank molding station to a blow molding station, (c) forming a glass container having a final shape from the glass preform at the blow molding station, (d) introducing a coating material into an interior of the gob of molten glass, the glass preform, or the glass container while the glass is still hot from being formed to form a coating on an interior surface thereof, and (e) annealing the glass container. The coating material comprises a suspension of nanoparticles in a liquid medium, and, when the coating material is introduced into the interior of the gob of molten glass, the glass preform, or the glass container, heat from the glass is transferred to the liquid medium to vaporize the liquid medium and form the coating on the interior surface of the gob of molten glass, the glass preform, or the glass container.

The coating material may be introduced into the interior of the gob of molten glass, the glass preform, or the glass container during one or more stages of a glass container forming process, which may involve a blow-and-blow system, a press-and-blow system, or any other forming system. For example, the coating material may be introduced into the interior of the gob of molten glass and/or the glass preform at the blank forming station at the same time or immediately after the glass preform is blown or pressed into shape. Or the coating material may be introduced into the interior of the glass preform as the preform is being transferred from the blank forming station to the blow molding station. As another example, the coating material may be introduced into the interior of the glass preform and/or the glass container at the blow molding station at the same time or immediately after the glass container is blown into its final shape. Or the coating material may be introduced into the interior of the glass container while the glass container is being transferred from the blow molding station to an annealing lehr. For example, the coating material may be introduced into the interior of the glass container while the container is being transferred from the blow molding station to a deadplate, conveyor, or another location upstream of the annealing lehr. In some cases, the coating material may be introduced into the interior of the glass container at a glass container coating system positioned in-line or offline upstream of the annealing lehr.

A process for coating an interior surface of a glass container, in accordance with another aspect of the disclosure, includes: (a) forming a glass preform having an initial shape from a gob of molten glass at a blank molding station during a blank molding stage, (b) transferring the glass preform from the blank molding station to a blow molding station during an invert stage, (c) forming a glass container having a final shape from the glass preform at the blow molding station during a blow molding stage, (d) transferring the glass container from the blow molding station to a deadplate during a takeout stage, (e) introducing a coating material into an interior of the gob of molten glass, the glass preform, or the glass container while the glass is at a temperature in the range of 200-1200° C., and then (f) annealing the glass container. The coating material comprises a suspension of nanoparticles in a liquid medium and, when the coating material is introduced into an interior of the gob of molten glass, the glass preform, or the glass container, heat from the glass is transferred to the liquid medium to vaporize the liquid medium and form a coating on an interior surface of the glass preform or the glass container. The coating material may be introduced into the interior of the gob of molten glass, the glass preform, or the glass container during the blank molding stage, the invert stage, the blow molding stage, or the takeout stage.

BRIEF DESCRIPTION OF THE DRAWINGS

The disclosure, together with additional objects, features, advantages and aspects thereof, will be best understood from the following description, the appended claims and the accompanying drawings, in which:

FIGS. 4A-4J are diagrammatic views of various stages of a glass container forming process.

DETAILED DESCRIPTION

Figure 1:
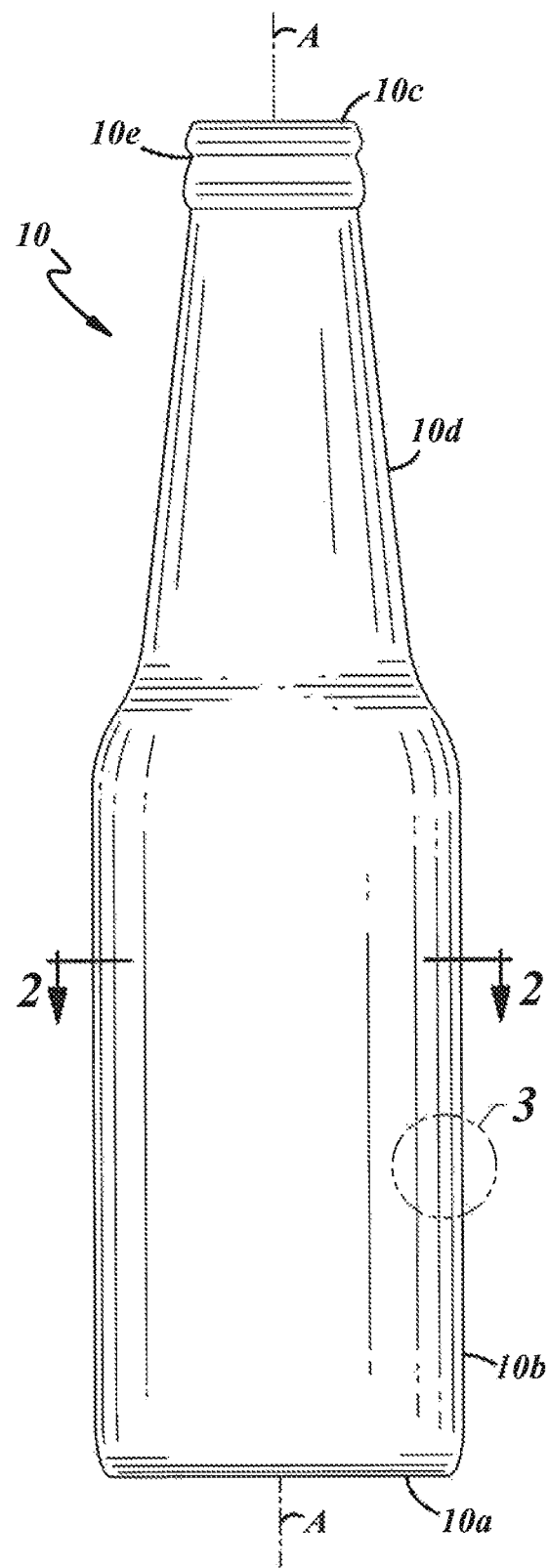
FIG. 1 is a side elevation view of a glass container, in accordance with one illustrative embodiment of the present disclosure.

FIG. 1 illustrates a glass container 10 in accordance with one embodiment of the present disclosure. The glass container 10 includes a longitudinal axis A, a closed base 10a at one axial end of the container 10, a body 10b extending in an axial direction from the closed base 10a, and an open mouth 10c at another axial end of the container 10 opposite of the base 10a. Accordingly, the glass container 10 is hollow. In the illustrated embodiment, the container 10 also includes a neck 10d that extends axially from the body 10b, terminates at the mouth 10c, and includes a finish 10e having one or more features thereon for attachment of a desired closure (not shown). However, the container 10 need not include the neck 10d and the mouth 10c may terminate the body 10b, such as in a glass jar embodiment or the like. The body 10b may be of any suitable shape in cross-section transverse to the axis A as long as the body 10b is circumferentially closed.

Figure 2:
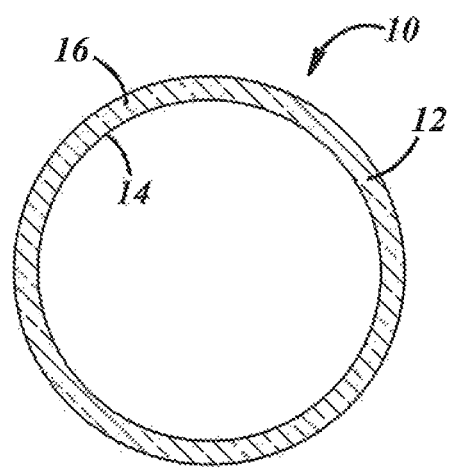
FIG. 2 is a cross-sectional view of a body portion of the glass container, taken along line 2-2 of FIG. 1.

Referring now to FIG. 2, the container 10 includes a glass substrate 12 having an interior surface 14 and an exterior surface 16. The glass substrate 12 may be made of an inorganic silica-based glass, such as soda-lime-silica glass, borosilicate glass, or aluminosilicate glass. In one form, the glass substrate 12 may have a thickness, measured from the interior surface 14 to the exterior surface 16, or vice versa, of up to eight millimeters. For example, the glass substrate 12 may have a thickness in the range of one millimeter to five millimeters, including all ranges and subranges therebetween.

Figure 3:
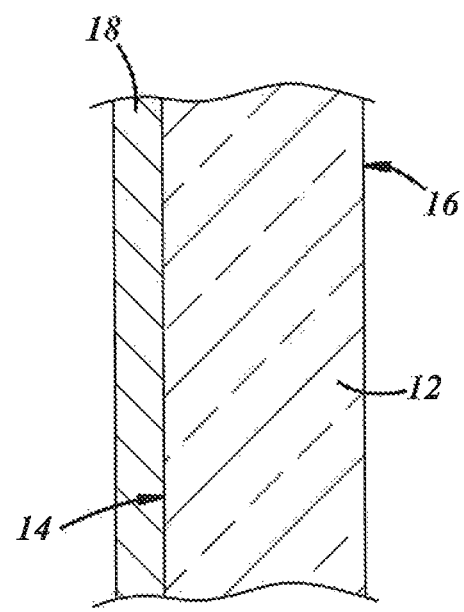
FIG. 3 is an enlarged cross-sectional view of a body portion of the glass container, taken from circle 3 of FIG. 1.

As illustrated in FIG. 3, the container 10 also includes a coating 18 overlying the interior surface 14 of the glass substrate 12. The coating 18 may impart certain desirable properties to the glass container 10, including strength, color, ultraviolet (UV) light protection, anti-reflectivity, and corrosion resistance. Additionally or alternatively, the coating 18 may prepare the interior surface 14 of the glass substrate 12 for the subsequent deposition of an additional hot end coating and/or a cold end coating. In one form, the coating 18 may increase the lubricity of the interior surface 14 of the glass substrate 12, which may allow a product dispensably disposed within the container 10 to be more rapidly and/or more thoroughly dispensed from the container 10. The UV light protection properties of the coating 18 may involve the blocking of UV light within a certain range of wavelengths or the filtering of a desired percentage of UV light. The coating 18 may strengthen the glass container 10 by filling-in, migrating into or "healing" flaws on the interior surface 14 of the glass substrate 12. The coating 18 may provide corrosion resistance to the interior surface 14 of the container 10 by acting as a protective barrier, for example, by preventing alkali metal cations from leaching out of the glass substrate 12. The coating 18 may prepare the interior surface 14 of the glass substrate 12 for the subsequent deposition of a compatible cold end coating, for example, by increasing the number of bonding sites on the interior surface 14 of the glass substrate 12. The coating 18 may have a thickness in the range of about 2 nanometers to 200 nanometers, including all ranges and subranges therebetween.

The coating 18 may comprise one or more metal oxides and may have a substantially uniform amorphous structure. Examples of suitable metal oxides for the coating 18 include silica ($SiO_2$), titanium dioxide ($TiO_2$), aluminum oxide ($Al_2O_3$), magnesium oxide (MgO), nickel oxide (NiO), chromium oxide ($O_2O_3$), zinc oxide (ZnO), vanadium oxide (VO, $VO_2$, $V_2O_3$, and/or $V_2O_5$), and combinations thereof. In one embodiment, the coating 18 may consist essentially of silica ($SiO_2$). Titanium dioxide ($TiO_2$) may be included in the coating 18 to impart anti-reflective properties to the glass container 10. Aluminum oxide ($Al_2O_3$) may be included in the coating 18 to impart, corrosion resistance to the interior surface 14 of the container 10. Magnesium oxide (MgO) may be included in the coating 18 to impart electrical insulation to the interior surface 14 of the container 10. Nickel oxide (NiO) may be included in the coating 18 to impart a grey color to the container 10. Chromium oxide ($O_2O_3$) may be included in the coating 18 to impart a green color to the glass container 10. Zinc oxide (ZnO) may be included in the coating 18 to impart electrical conductivity, UV protection, and/or anti-reflective properties to the glass container 10. Vanadium oxide may be included in the coating 18 to impart UV protection to the glass container 10.

In the embodiment illustrated in FIG. 3, the coating 18 is formed directly on the interior surface 14 of the glass substrate 12 and comprises a single monolithic layer. In other embodiments, the coating 18 may comprise multiple layers, with each layer having the same or different chemical compositions. For example, the coating 18 may comprise two layers, with one of the layers consisting essentially of silica ($SiO_2$) and the other layer comprising at least one other metal oxide, e.g., $TiO_2$, $Al_2O_3$, MgO, NiO, $Cr_2O_3$, and/or ZnO. As another example, the coating 18 may comprise three layers, with the first, second and third layers being formed sequentially, one over the other. In one specific embodiment, the first layer may consist essentially of silica ($SiO_2$) and may be formed directly on the interior surface 14 of the glass substrate 12, the second layer may comprise at least one other metal oxide and may be formed directly on the first layer over the interior surface 14 of the glass substrate 12, and the third layer may consist essentially of silica ($SiO_2$) and may be formed directly on the second layer over the interior surface 14 of the glass substrate 12. By forming the first, second and third layers in this way, the second layer of the at least one other metal oxide may be completely encapsulated by the first and third layers of silica ($SiO_2$).

When the coating 18 comprises multiple layers, the various layers may be formed adjacent one another and may over lay one another on the interior surface 14 of the glass substrate 12. However, in some embodiments, one or more of the layers may penetrate into or even through one or more of the other coating layers. Accordingly, the multiple layers may be fairly described as being applied generally to the glass substrate 12, regardless of how or to what extent any given layer contacts any of the other layers and/or the substrate 12.

The glass container 10 may be formed in a glass container-forming machine of the individual section (I.S.) type using a blow-and-blow system, a press-and-blow system, or any other glass container forming system that includes a blank molding stage, wherein a gob of molten glass is formed into a parison or preform having an initial shape, and a final blow molding stage, wherein the preform is blown or otherwise formed into the final shape of the glass container 10. The coating 18 may be formed on the interior surface 14 of the glass container 10 at one or more different stages of the glass container forming process. For example, the coating 18 may be formed on the interior surface 14 of the glass container 10 by introducing a coating material into an interior of the gob of molten glass or into an interior of the glass preform. Additionally or alternatively, the coating 18 may be formed on the interior surface 14 of the glass container 10 by introducing the coating material into an interior of the glass container 10 itself.

During formation of the glass container 10, a gob of molten glass is transformed into a glass preform, which is then transformed into the shape of the glass container 10, and, during these transformation steps, the glass may pass through embodiments where it does not exhibit the precise shape of a gob, a preform, or a container, but instead exhibits some in-between shape. However, due to the inherent limitations of language, the coating material will be referred to herein as being introduced into the interior of a gob of molten glass, a glass preform, or a glass container, even though the glass may not exhibit the precise shape of a gob, a preform, or a container.

The coating material used to form the coating 18 is preferably introduced into an interior of a gob of molten glass, a glass preform, or a glass container 10 while the glass is still hot from being formed, for example, while the glass is at a temperature in the range of 200 degrees Celsius to 1200 degrees Celsius, including ail ranges and subranges therebetween. For example, the coating material may be introduced into an interior of the gob of molten glass while the glass is at a temperature in the range of 1000 degrees Celsius to 1250 degrees Celsius, including all ranges and subranges therebetween. Or the coating material may be introduced into an interior of the glass preform while the glass is at a temperature in the range of 900 degrees Celsius to 1200 degrees Celsius, including all ranges and subranges therebetween. Or the coating material may be introduced into an interior of the glass container 10 while the glass is at a temperature in the range of 200 degrees Celsius to 1000 degrees Celsius, including all ranges and subranges therebetween.

During formation of the glass container 10, the temperature of the gob of molten glass, the glass preform, and the glass container 10 may be different at a surface portion of the glass as compared to an interior portion thereof. Therefore, any reference to the temperature of the gob of molten glass, the glass preform, and the glass container 10 will refer to an average overall temperature of the glass, and not any specific point within the glass itself.

The coating material introduced into the interior of the gob of molten glass, the glass preform, or the glass container 10 includes a liquid phase and a solid phase. The solid phase of the coating material may account for 1.0 wt. % to 15.0 wt. % of the coating material, including all ranges and subranges therebetween. The coating material is formulated such that, when the coating material is introduced into the gob of molten glass, the glass preform, or the glass container 10, the liquid phase of the coating material undergoes a phase transition from a liquid to a vapor or gas phase by a heat transfer from the relatively hot glass to the coating material. As the liquid phase of the coating material vaporizes, it rapidly expands or increases in volume, which may help deposit the solid phase of the coating material on an interior surface of the gob of molten glass, the glass preform, or the glass container 10, thereby forming the coating 18. In particular, this abrupt phase transition may project the solid phase of the coating material toward an interior surface of the gob of molten glass, the glass preform, or the glass container 10. In some instances, the intense, almost explosive force generated during this phase transition may cause some of the solid phase of the coating material to become embedded in the gob of molten glass, the glass preform, or the glass container 10. In one form, some of the solid phase of the coating material may become embedded in the interior surface 14 of the glass container 10 along the neck 10d and/or at an upper end of the body 10b, near the neck 10d.

Introducing the coating material into the gob of molten glass, the glass preform, or the glass container 10 while the glass is still hot from being formed avoids the need for a secondary reheating step, which might otherwise be required to evaporate the liquid phase of the coating material and/or cure the coating 18 on the interior surface 14 of the glass container 10. In addition, in embodiments where the coating material is applied to the glass while the glass is at a temperature above the softening point of the glass (e.g., about 724° C. for soda-lime glass), the rapid expansion of the liquid phase of the coating material may allow the solid phase of the coating material to be embedded in the glass.

The coating material may comprise a plurality of nanoparticles dissolved or dispersed in a liquid medium. The nanoparticles may comprise one or more metal oxides of silica ($SiO_2$), titanium dioxide ($TiO_2$), aluminum oxide ($Al_2O_3$), magnesium oxide (MgO), nickel oxide (NiO), chromium oxide ($Cr_2O_3$), and/or zinc oxide (ZnO). As such, the coating material may have a metal oxide content in the range of 0.5 wt. % to 10.0 wt. %, including all ranges and subranges therebetween. The nanoparticles may have mean particle diameters in the range of 2-200 nanometers, including all ranges and subranges therebetween, and may take or a variety of different shapes, including spheres, rods, tubes, wires, flakes, and/or fibers, to name a few. The shape of the nanoparticles may be selected based upon the shape of any known flaws and/or irregularities on the interior surface 14 of the glass substrate 12.

The liquid medium in which the nanoparticles are dissolved or dispersed may comprise a polar protic solvent, a polar aprotic solvent, or a combination thereof. Examples of suitable polar protic solvents for the coating material include water, isopropanol, ethanol, and methanol. Examples of suitable polar aprotic solvents for the coating material include tetrahydrofuran, ethyl acetate, acetone, and acetonitrile.

The coating material also may include a "silica precursor," i.e., a silicon (Si)-containing compound that is converted to silica ($SiO_2$) after the coating material is injected into the container 10. For example, the coating material may include a silicon-containing compound that is converted to silica ($SiO_2$) via a thermal oxidation or decomposition reaction or via one or more polymerization reactions, e.g., hydrolysis and condensation reactions. Examples of some suitable silicon (Si)-containing compounds include: polysilicic acids, halosilanes, soluble alkali silicates, hydrolyzable silanes, silanols, siloxanes, silazanes, alkoxysilanes, aryloxysilanes, acyloxysilanes, haloalkylsilanes, and haloarylsilanes, and combinations thereof.

Figure 4A:
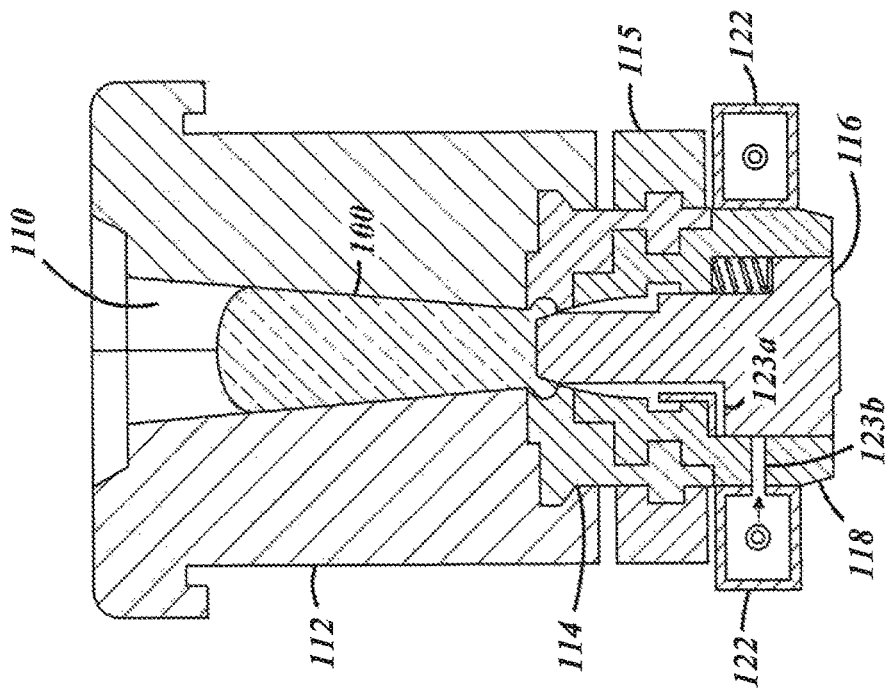
Figure 4B:
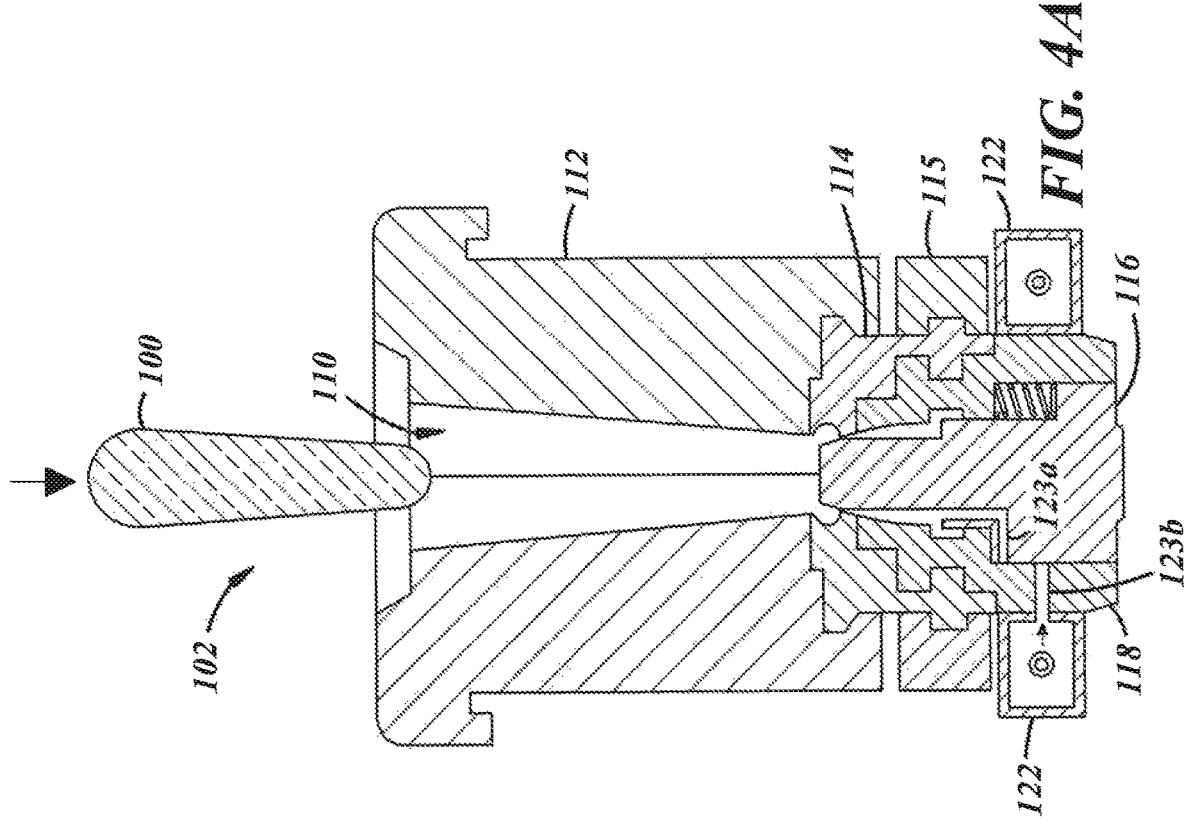

FIGS. 4A-4J illustrate various stages of an exemplary glass container forming process that uses a blow-and-blow system. In an initial blank forming stage (FIG. 4A), a gob of molten glass 100 is delivered to a blank forming station 102 and charged into a cavity 110 defined by a blank mold 112 and a neck ring 114 carried by a neck ring carrier 115. A plunger 116 and a plunger guide 118 are carried coaxially by the neck ring 114. When the gob of molten glass 100 is introduced into the cavity 110, the plunger 116 is in an advanced position such that a tip of the plunger 116 extends partway into a lower end of the cavity 110 defined by the neck ring 114 (FIGS. 4A and 4B). The gob of molten glass 100 is introduced into the cavity 110 such that a portion of the molten glass settles into the spaced defined between the tip of the plunger 116 and the neck ring 114 to form a finish portion of a final glass container.

After the gob 100 has settled into the cavity 110 (FIG. 4B), a baffle 120 is placed over an upper end of the cavity 110 and the plunger 116 is moved to a retracted position below the lower end of the cavity 110 (FIGS. 4C and 4D). Compressed gas is communicated to a manifold 122 in fluid communication with one or more passageways 123a, 123b extending through the plunger 116 and the plunger guide 118 such that the compressed gas flows around the plunger 116, through the neck ring 114, and enters the cavity 110 to form a bubble 124 within the gob of molten glass 100. The bubble 124 gradually expands within the gob of molten glass 100 due to the pressure of the incoming gas until the molten glass is pressed against inner wall surfaces of the blank mold 112 and shaped into a preform 104 of the glass container 10 (FIG. 4D), also known as a "parison." In a press-and-blow system, instead of forming a bubble 124 within the gob of molten glass 100, a relatively long, reciprocating plunger would be used to press the gob of molten glass 100 into the blank mold 112 and into the initial shape of the preform 104. Of course other forming systems may be used to form the gob of molten glass 100 into the initial shape of the preform 104 or parison in the blank forming stage. The temperature of the gob of molten glass 100 and/or the preform 104 during the blank forming stage may be in the range of 1100° C. to 1200° C., including all ranges and subranges therebetween.

The coating 18 may be formed during one or more stages of the glass container forming process. For example, the coating 18 may be formed by introducing the coating material into an interior 126 of the preform 104 during the blank forming stage while the preform 104 is at the blank forming station 102. In embodiments where a blow-and-blow system is used, a predetermined amount of coating material may be supplied through the one or more passageways 123*a*, 123*b* to the interior 126 of the preform 104 along with the gas used to blow the gob of molten glass 100 into the shape of the preform 104. Or the coating material may be supplied to the interior 126 of the preform 104 using an injector 128 (FIGS. 4C and 4D) that injects the coating material into the interior 126 of the preform 104. For example, as shown in FIG. 4C, the coating material may be simultaneously injected into the interior 126 of the preform 104 by the injector 128 as the gob of molten glass 100 is being blown into the shape of the preform 104 by the blow gas. As shown in FIG. 4D, the coating material may be supplied to the interior 126 of the preform 104 by the injector 128 after the preform 104 has been blown into shape by the blow gas. As compared to conventional blank forming stations, the configuration of the neck ring 114, neck ring carrier 115, plunger 116, and/or plunger guide 118 may need to be modified so that the coating material can be effectively supplied to the interior 126 of the preform 104 during this stage of the process. In embodiments where a press-and-blow system is used, a predetermined amount of coating material may be supplied to the interior 126 of the preform 104 after the preform 104 has been pressed into shape (not shown).

Figure 4E:
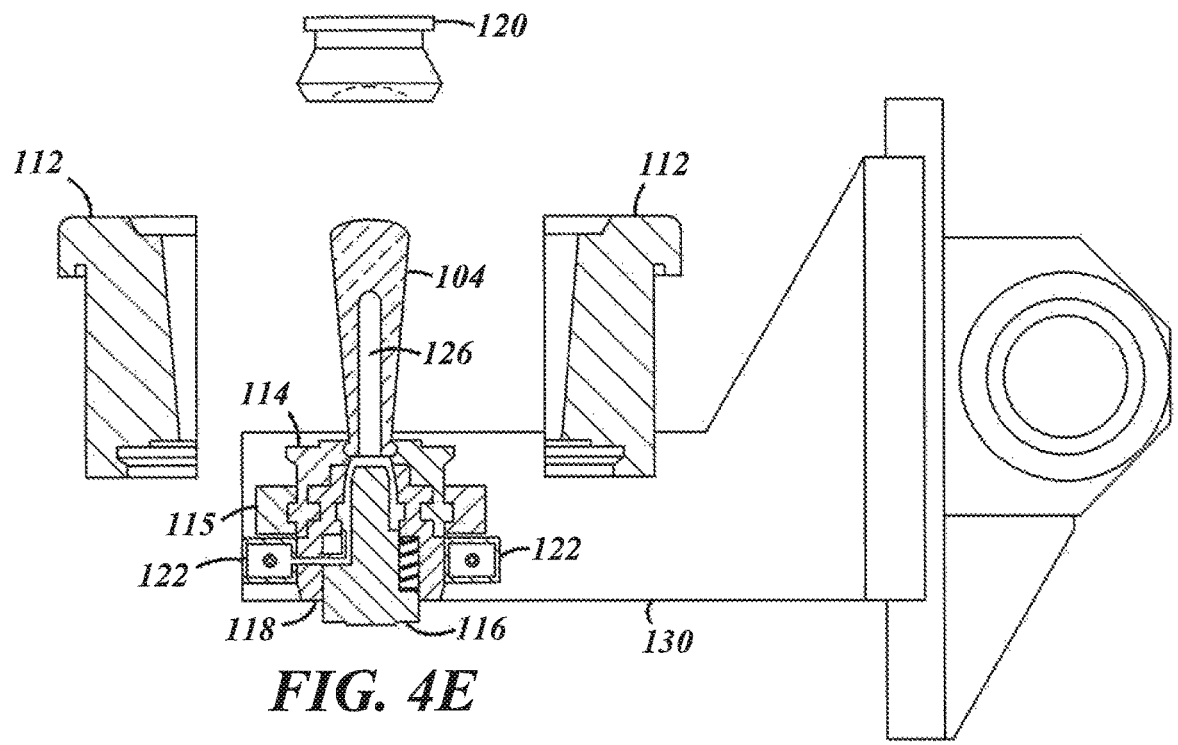
Figure 4F:
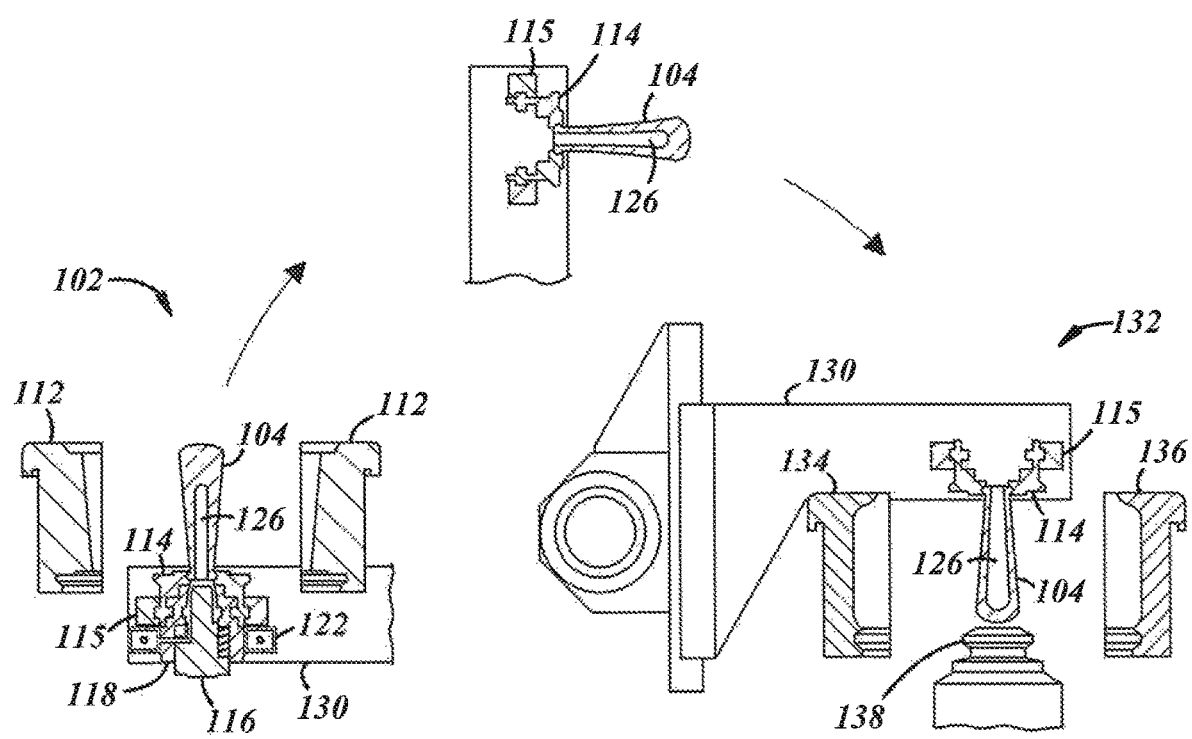

Referring now to FIG. 4E, after the preform 104 is blown, pressed, or otherwise formed into shape, the baffle 120 is raised and the blank mold 112 is opened. During a subsequent invert stage, the preform 104 remains supported by the neck ring 114 and neck ring carrier 115, which are carried by an invert or transfer arm 130. During the invert stage (FIG. 4F), the transfer arm 130 inverts the preform 104 and transfers it to a blow molding station 132, which includes a blow mold comprising a pair of blow mold halves 134, 136 and a bottom plate 138.

In some embodiments, the coating 18 may be formed by introducing the coating material into the interior 126 of the preform 104 during the invert stage while the preform 104 is being transferred between the blank forming station 102 and the blow molding station 132 by the transfer arm 130. The temperature of the preform 104 during transfer between the blank forming station 102 and the blow molding station 132 is typically in the range of 900° C. to 1100° C., including all ranges and subranges therebetween. As compared to conventional transfer operations, the configuration of the neck ring 114, neck ring carrier 115, and/or transfer arm 130 may need to be modified so that the coating material can be effectively supplied to the interior 126 of the preform 104.

Figure 4G:
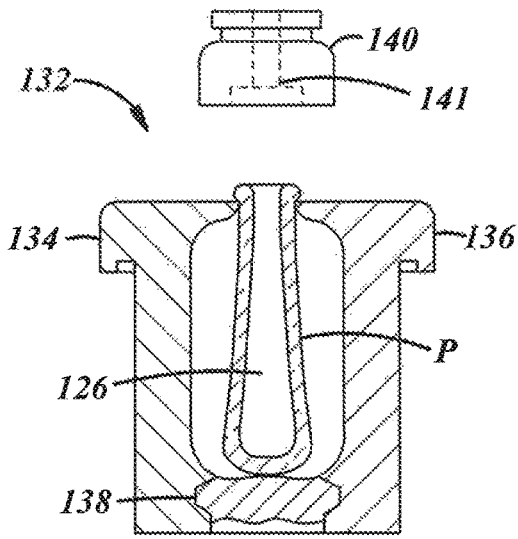

At the blow molding station 132, the blow mold halves 134, 136 are closed relative to the preform 104 such that the preform 104 is positioned within a cavity defined by the blow mold halves 134, 136 of the blow mold (FIG. 4G). When the neck ring 114 is opened (not shown), the preform 104 becomes suspended from upper portions of the blow mold halves 134, 136 (FIG. 4G). Thereafter, during a final blowing stage (FIG. 4H), a blowhead 140 is brought into overlying relationship with respect to the blow mold halves 134, 136 and gas under pressure is introduced into the interior 126 of the preform 104 via an opening 141 in the blowhead 140 such that the preform 104 is blown into contact with inner surfaces of the blow mold halves 134, 136 and formed into the shape of a glass container 10'. The temperature of the glass container 10' during the final blowing stage is typically in the range of 700° C. to 1000° C., including all ranges and subranges therebetween.

Figure 4H:
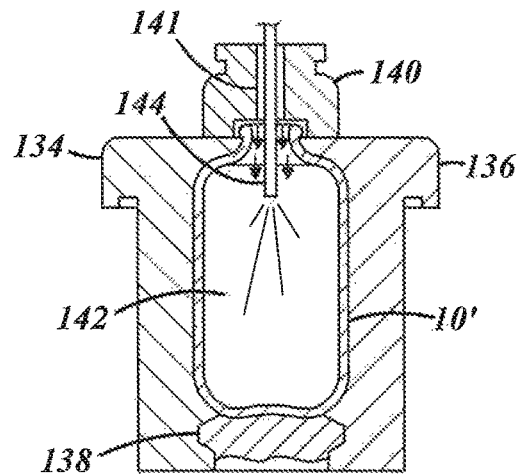

In some embodiments, the coating 18 may be formed by introducing the coating material into an interior 142 of the container 10' during the blow molding stage while the container 10' is at the blow molding station 132. For example, a predetermined amount of coating material may be supplied to the interior 142 of the container 10' through the opening 141 in the blowhead 140 along with the blow gas that is being used to blow the preform 104 into the shape of the container 10'. Or the coating material may be supplied to the interior 142 of the container 10' via a separate injector 144 (FIG. 4H). The coating material may be simultaneously supplied to the interior 142 of the container 10' by the injector 144 as the blow gas is being introduced into the interior 142 of the container 10' via the opening 141 in the blowhead 140. Or the coating material may be supplied to the interior 142 of the container 10' by the injector 144 after the container 10' has been blown into its final shape. As compared to conventional blow molding stations, the configuration of the blowhead 140 may need to be modified so that the coating material can be effectively supplied to the interior 142 of the glass container 10' along with or immediately after the final blow air.

Figure 4I:
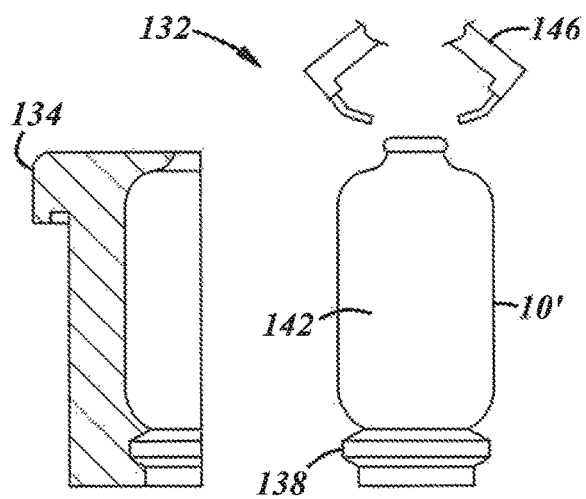
Figure 4J:
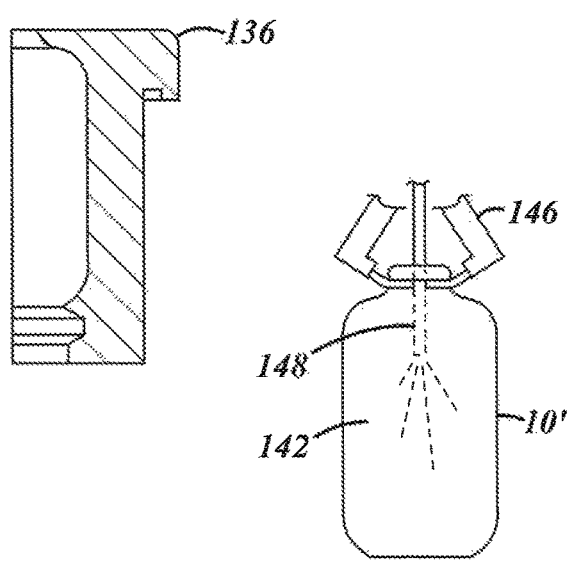

Referring now to FIGS. 4I and 4J, after the final blowing stage, the blown glass container 10' is cooled before it is removed from the blow molding station 132 by a takeout mechanism including a tong assembly 146 during a takeout stage of the process. The temperature of the glass container 10' during the takeout stage may be in the range of 600° C. to 800° C., including all ranges and subranges therebetween. The tong assembly 146 grasps a finish portion of the blown glass container 10' and transfers the container 10' from the blow molding station 132 to a deadplate (not shown) for further cooling. The temperature of the glass container 10' during the deadplate cooling stage may be in the range of 500° C. to 700° C., including all ranges and subranges therebetween. During a subsequent transfer stage, a sweepout mechanism (not shown) may be used to transfer the glass container 10' from the deadplate to a moving conveyor (not shown), which may deliver the glass container 10 to an annealing lehr where the glass container 10' is annealed. The temperature of the glass container 10' during transfer to the annealing lehr may be in the range of 200° C. to 500° C., including all ranges and subranges therebetween.

In some embodiments, the coating 18 may be formed by introducing the coating material into the interior 142 of the container 10' during the takeout stage while the container 10' is being transferred from the blow molding station 132 to the deadplate. For example, a predetermined amount of coating material may be supplied to the interior 142 of the container 10' by an injector 148 (FIG. 4J). This approach may involve modifying the configuration of the takeout mechanism to allow for the coating material to be supplied to the interior 142 of the glass container 10' during the takeout and/or transfer process. Additionally or alternatively, the coating 18 may be formed by introducing the coating material into the interior 142 of the container 10' during the subsequent transfer stage while the container 10' is being transferred from the deadplate to the conveyor, the annealing lehr, or some other stage of the glass container forming process.

The coating 18 may include multiple layers, each of which may be formed at the same or a different stage of the glass container forming process. In addition, each of the individual layers within the coating 18 may be formed from a coating material having the same chemical composition or a different chemical composition than the coating material used to form one or more of the other layers in the coating 18. For example, a first coating material may be introduced into an interior of a preform of the glass container or into an interior of the glass container 10 itself to form a first coating layer on the interior surface 14 of the glass container 10. Thereafter, second coating material have the same or different chemical composition than the first coating material may be introduced into the interior of the preform of the glass container or into the interior of the glass container 10 to form a second coating layer on the interior surface 14 of the glass container 10 over the first coating layer.

After formation of the coating 18 on the interior surface 14 of the glass container 10, a conventional hot end coating may be applied to the exterior surface 16 of the glass container 10. Thereafter, the glass container 10 may be annealed, for example, by being passed through an annealing lehr (not shown). At an entry, hot end, or upstream portion of the annealing lehr, the glass container 10 may be heated to a temperature in the range of about 500 degrees Celsius to 550 degrees Celsius, including all ranges and subranges therebetween. Thereafter, the temperature of the glass container 10 may be brought down gradually as the container 10 is transferred to a downstream portion, cool end, or exit of the lehr to remove any stress points that may have developed in the glass substrate 12. For example, the glass container 10 may be brought down to a temperature of between 130 degrees Celsius and 65 degrees Celsius, including all ranges and subranges therebetween.

After the glass container 10 is annealed, one or more cold end coatings may be applied to the exterior surface 16 of the glass container 10 over the exterior hot end coating. One or more cold end coatings also may be applied to the interior surface 14 of the glass container 10 over the coating 18. The glass container 10 may then be inspected for commercial variations, sorted, labeled, packaged and/or stored for further processing.

Figure 5:
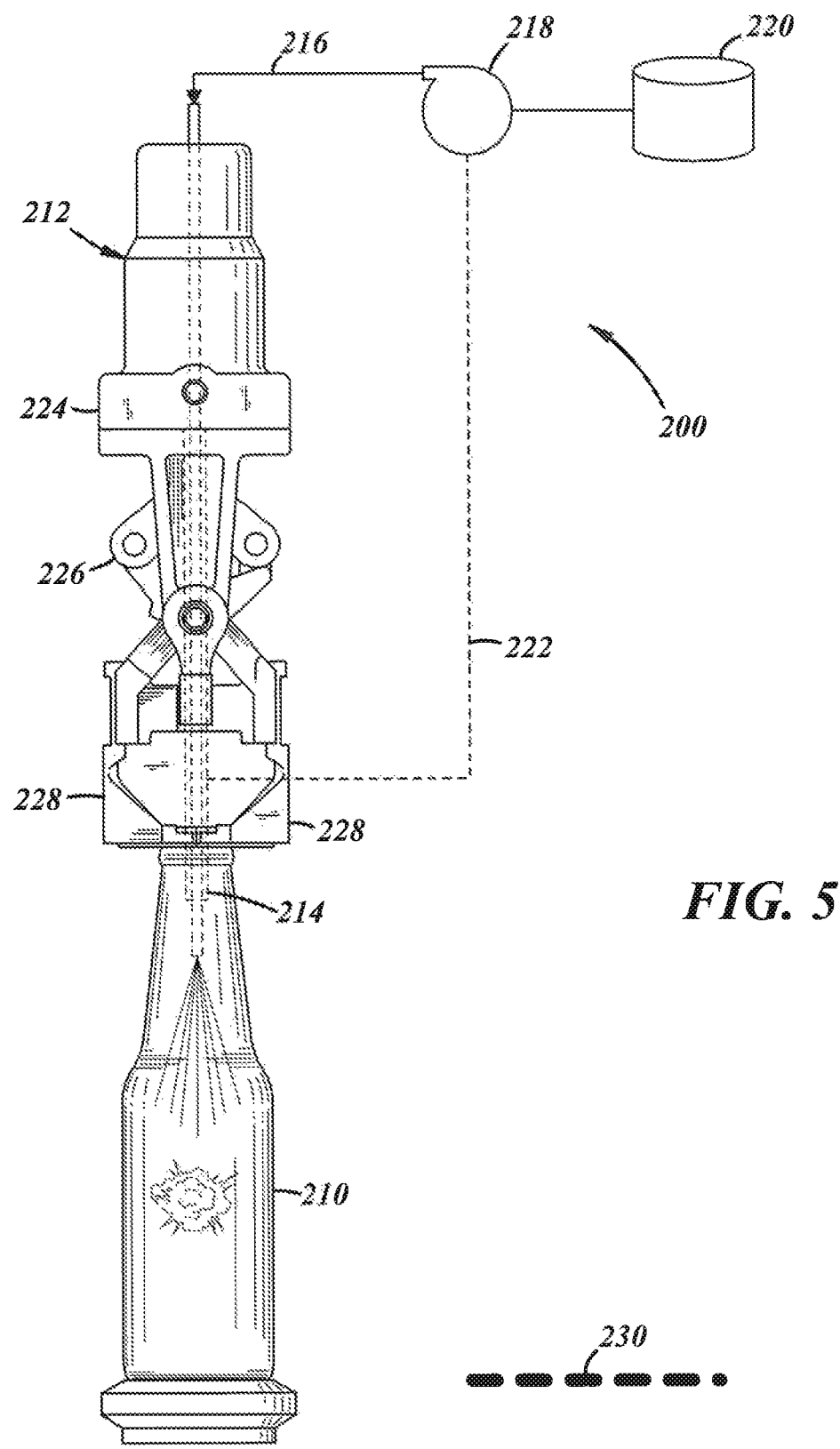
FIG. 5 is a schematic illustration of a takeout assembly and a coating system for injecting coating material into an interior of a glass container, in accordance with another embodiment of the present disclosure.

FIG. 5 illustrates a glass container coating system 200 for coating an interior surface of a glass container 210 with coating material, in accordance with one embodiment of the present disclosure. The coating system 200 is coupled to a takeout mechanism 212 and includes an injector 214, a delivery line 216, a pump 218, a reservoir tank 220, and a signal line 222. In other embodiments, the coating system 200 may additionally or alternatively be directly or indirectly coupled to a neck mold of a blank forming station or a blowhead of a blow molding station. The takeout mechanism 212 includes a housing 224 that serves as a carrier for a tong assembly 226. The tong assembly 226 illustrated in FIG. 5 includes a pair of opposed tongs 228, which are configured to close upon and grasp a finish of the glass container 210 and to transfer the container 210 to a deadplate 230 for further cooling.

The injector 214 extends through a mouth of the glass container 210 into an interior of the container 210 and supplies coating material to the interior of the glass container 210. The injector 214 may include one or more openings through which the coating material is discharged. The injector 214 may be vertically adjustable dynamically along with the container 210. The coating material is supplied to the injector 214 by the delivery line 216, which is in fluid communication with the pump 218 and the tank 220 in which a volume of the coating material is held. In some embodiments, the injector 214 may include one or more features (not shown) that engage and/or grasp the finish of the container 210. Such features may help properly locate the injector 214 relative to the container 210 prior to coating.

The coating system 200 may be programmed to discharge a predetermined amount of the coating material from the injector 214 after the glass container 210 has been securely grasped by the tongs 228. A sensor (not shown) may be used to detect the position of the glass container 210, and the pump 218 may be activated by receiving a signal from the sensor via the signal line 222. After the pump 218 is activated, the pump 218 may pump a predetermined amount of the coating material from the tank 220 to the injector 214 via the delivery line 216. The coating system 200 may be programmed with a pause phase between injection phases to account for the time required to transfer the glass container 210 to the deadplate 230 and to pick up a newly formed glass container. Additionally and/or alternatively, the coating system 200 may be programmed with a pause phase between injection phases to allow for multiple layers of the coating material to be sequentially applied to the interior of the glass container 210.

When the coating material is delivered to the interior of the glass container 210, the coating material is immediately exposed to the high temperature environment within the newly formed container 210, which rapidly increases the temperature of the coating material. Once the liquid medium of the coating material reaches its boiling point, the liquid medium will rapidly transition from a liquid phase to a vapor or gas phase, which will result in a significant and abrupt increase in volume. For example, if the liquid medium of the coating material is water, the phase change from liquid water to gaseous steam will result in a 1700-fold increase in volume. This rapid increase in volume may exert an intense and almost explosive force on the solid phase nanoparticles, which may help deposit the nanoparticles of the coating material on the interior surface of the container 210, and also may result in some of the nanoparticles becoming embedded in the glass itself.

There thus has been disclosed a process for coating an interior surface of a glass container, that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A process for coating an interior surface of a glass container that includes:
   (a) forming a glass preform from a gob of molten glass at a blank molding station;
   (b) transferring the glass preform from the blank molding station to a blow molding station and positioning the glass preform within a cavity defined by a blow mold;
   (c) forming a glass container having a final shape from the glass preform at the blow molding station by introducing compressed gas into the cavity and into an interior of the glass preform such that the glass is blown into contact with inner surfaces of the blow mold;
   (d) introducing a coating material comprising a suspension of nanoparticles in a liquid medium into an interior of the gob of molten glass, the glass preform, or the glass container while the glass is still hot from being formed such that heat from the glass is transferred to the liquid medium to vaporize the liquid medium and form a coating on an interior surface of the gob of molten glass, the glass preform, or the glass container; and then
   (e) annealing the glass container.

2. The process set forth in claim 1 wherein the coating material is introduced into the interior of the gob of molten glass, the glass preform, or the glass container while the glass is at a temperature in the range of 700 degrees Celsius to 1200 degrees Celsius.

3. The process set forth in claim 1 wherein said step (d) includes introducing the coating material into the interior of the gob of molten glass or the glass preform at the blank molding station while the gob of molten glass or the glass preform is at a temperature in the range of 1100 degrees Celsius to 1200 degrees Celsius.

4. The process set forth in claim 1 wherein said step (d) includes introducing the coating material into the interior of the glass preform while the glass preform is being transferred from the blank molding station to the blow molding station while the glass preform is at a temperature in the range of 900 degrees Celsius to 1100 degrees Celsius.

5. The process set forth in claim 1 wherein said step (d) includes introducing the coating material into the interior of the glass preform or the glass container at the blow molding station while the glass preform or the glass container is at a temperature in the range of 700 degrees Celsius to 1000 degrees Celsius.

6. The process set forth in claim 1 including:
   after said step (d), removing the glass container from the blow molding station via a takeout mechanism.

7. The process set forth in claim 1 including:
   after said step (d), transferring the glass container from the blow molding station to a deadplate; and then
   transferring the glass container from the deadplate to an annealing lehr.

8. The process set forth in claim 1 wherein the nanoparticles comprise at least one metal oxide selected from the group consisting of silica ($SiO_2$), titanium dioxide ($TiO_2$), aluminum oxide ($Al_2O_3$), magnesium oxide (MgO), nickel oxide (NiO), chromium oxide ($Cr_2O_3$), and zinc oxide (ZnO).

9. The process set forth in claim 8 wherein the coating material has a metal oxide content in the range of 0.5 wt. % to 10.0 wt. %.

10. The process set forth in claim 1 wherein the coating material has a solids content in the range of 1.0 wt. % to 15.0 wt. %.

11. The process set forth in claim 1 wherein the nanoparticles have a mean particle size in the range of 2 nm to 200 nm.

12. The process set forth in claim 1 wherein the liquid medium is selected from the group consisting of polar protic solvents, polar aprotic solvents, and mixtures thereof.

13. The process set forth in claim 1 wherein the coating material comprises a silica precursor selected from the group consisting of polysilicic acids, halosilanes, soluble alkali silicates, hydrolyzable silanes, silanols, siloxanes, silazanes, alkoxysilanes, aryloxysilanes, acyloxysilanes, haloalkylsilanes, and haloarylsilanes, and combinations thereof.

14. The process set forth in claim 1 including:
   introducing a first coating material comprising a suspension of nanoparticles in a liquid medium into an interior of the gob of molten glass, the glass preform, or the glass container while the glass is still hot from being formed to form a first coating layer on an interior surface of the gob of molten glass, the glass preform, or the glass container; and
   introducing a second coating material comprising a suspension of nanoparticles in a liquid medium into an interior of the gob of molten glass, the glass preform, or the glass container while the glass is still hot from being formed to form a second coating layer on the interior surface of the gob of molten glass, the glass preform, or the glass container over the first coating layer.

15. A process for coating an interior surface of a glass container that includes:
   (a) forming a glass preform having an initial shape from a gob of molten glass at a blank molding station during a blank molding stage;
   (b) transferring the glass preform from the blank molding station to a blow molding station during an invert stage and positioning the glass preform within a cavity defined by a blow mold;
   (c) forming a glass container having a final shape from the glass preform at the blow molding station during a blow molding stage by introducing compressed gas into the cavity and into an interior of the glass preform such that the glass is blown into contact with inner surfaces of the blow mold;
   (d) transferring the glass container from the blow molding station to a deadplate during a takeout stage;
   (e) introducing a coating material comprising a suspension of nanoparticles in a liquid medium into an interior of the gob of molten glass, the glass preform, or the glass container while the glass is at a temperature in the range of 700 degrees Celsius to 1200 degrees Celsius such that heat from the glass is transferred to the liquid medium to vaporize the liquid medium and form a coating on an interior surface of the glass preform or the glass container, wherein the coating material is introduced into the interior of the gob of molten glass, the glass preform, or the glass container during the blank molding stage, the invert stage, or the blow molding stage; and then
   (f) annealing the glass container.

16. The process set forth in claim 15 including:
   introducing the gob of molten glass into a cavity defined by a blank mold, and
   forming the gob of molten glass into the initial shape of the glass preform by introducing compressed gas into the cavity and into an interior of the gob of molten glass such that the molten glass is pressed against inner wall surfaces of the blank mold.

17. The process set forth in claim 16 wherein the coating material is introduced into the interior of the gob of molten glass along with the compressed gas while the gob of molten glass is at a temperature in the range of 1000-1200° C.

18. The process set forth in claim 16 wherein the coating material is introduced into an interior of the glass preform after the glass perform has been formed into its initial shape while the glass perform is at a temperature in the range of 900-1200° C.

19. The process set forth in claim 15 wherein the coating material is introduced into the interior of the glass preform along with the compressed gas while the glass perform is at a temperature in the range of 900-1100° C.

20. The process set forth in claim 15 wherein the coating material is introduced into an interior of the glass container after the glass container has been formed into the final shape and while the glass container is at a temperature in the range of 700-1000° C.

* * * * *